Figure 1:
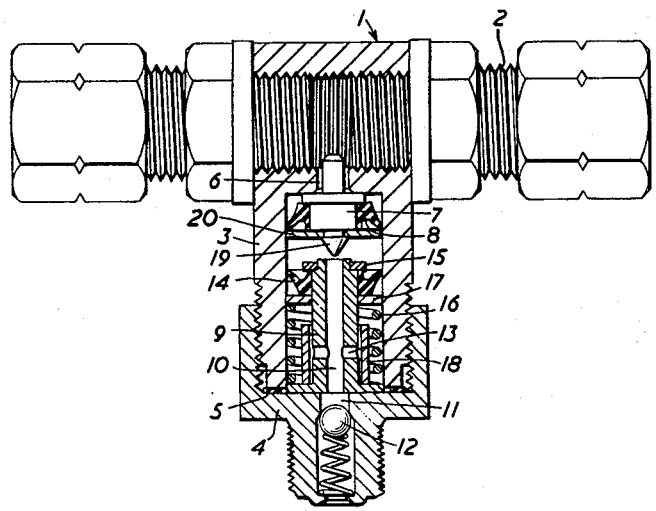

Jan. 28, 1964  H. E. JACKSON  3,119,463

LUBRICANT INJECTORS

Filed June 29, 1962

Inventor
Harold Ernest Jackson
By Cushman, Darby & Cushman
Attorney

United States Patent Office 3,119,463
Patented Jan. 28, 1964

3,119,463
LUBRICANT INJECTORS
Harold Ernest Jackson, Plympton St. Mary, Devon, England, assignor to Tecalemit Limited, Plymouth, Devon, England
Filed June 29, 1962, Ser. No. 206,213
3 Claims. (Cl. 184—7)

This invention relates to single-line lubricant injectors operating to deliver predetermined measured shots of lubricant when connected with a source of lubricant under pulsed pressure.

Various types of single-line lubricant injectors have been proposed hitherto but their designs are not wholly suitable in cases in which injectors of very small dimensions are required. Moreover they are not always sufficiently positive in the manner in which lubricant is discharged.

An object of the present invention is to provide a design of lubricant injector which is very easily applied to injectors of small dimensions.

An additional object of the invention is to provide an injector which operates positively to discharge a predetermined measured "shot" of grease or other lubricant on each pressure pulse.

A further object of the invention is to provide an injector in which the volume of the successive shots of lubricant injected can be varied by a simple change of one component of the injector.

A still further object of the invention is to provide an injector of very simple construction with a minimum of movable parts.

Two forms of injector according to the invention are illustrated by way of example in the accompanying drawings which will now be referred to. Each of the figures of the drawings illustrates an injector in half-sectional elevation. Corresponding parts of the two injectors are designated by like reference numerals.

The injector 1 shown in FIG. 1 is designed for screw connection as shown to a main lubrication line 2 fed with grease or oil which is alternately subjected to pressure and released from pressure. The injector comprises a body portion 3 and a cap portion 4 screwed together against an intervening sealing ring 5. The inlet passage 6 of the injector has associated therewith a free-floating valve member 7 having a U-type sealing ring 8 which forms a non-return seal with the peripheral wall of the injector chamber. A central tube 9 extends inwardly along the chamber from the cap portion. The central bore 10 of this tube communicates with the valve outlet passage 11 with which a spring loaded ball valve 12 is associated. Transverse passages 13 lead from the central bore 10 into the injector chamber. A piston or plunger 14 is slidably mounted on the tube 9 and seals against the peripheral wall of the chamber to divide it into an intake space in which the valve 7 is located and an output space which is in communication with the outlet passage 11 via the transverse passages 13 and the central bore 10 in the tube 9. The piston 14 is urged against a collar 15 on the tube 9 by a helical compression spring 16 and the piston can be displaced under lubricant pressure against the force of this spring until a rigid washer 17 which backs the sealing ring of the piston abuts a loose spacer tube 18. The washer 17 is of circular profile and makes a close sliding fit in the injector chamber.

The valve 7 is formed with a central cone 19 which in one position of the valve seats into the upper end of the central bore 10 of tube 9 and seals off communication between the intake and output spaces of the injector chamber. The sealing ring 8 is retained by a flange 20 which is locked behind the cone 19. Flange 20 is of generally square profile with rounded corners so as to provide ample peripheral clearance for the passage of lubricant.

The injector functions as follows: Assuming the injector chamber to be charged with grease, a pressure surge in the lubricant supply line displaces the valve 7 downwardly so that its central cone 19 seals off the bore 10. In practice the movement of the valve is very small, say a few thousandths of an inch. Grease then leaks past the sealing ring 8 of the valve 7 and grease pressure builds up against the piston 14 so that this is forced downwards against the spring 16 until the piston washer 17 abuts the spacer tube 18. During the piston displacement grease is forced through the outlet 11 past ball valve 12; the quantity of grease discharged is equal to the swept volume of the piston 14.

When the grease pressure at the injector inlet is reduced, piston 14 rises under the action of spring 16. The valve 7 rises with the piston (thus opening the tube bore 10) until the valve seats against the base of the body 3. Thereafter the piston 14 continues to rise until it abuts the collar 15. During this continued movement of the piston the grease between the piston 14 and the sealing ring 8 of the valve is placed under pressure so that it forces this sealing ring against the chamber wall, and the grease is constrained to enter the tube bore 10 thereby recharging the output space of the injector. The swept volume of the piston after the sealing of valve 7 is the recharge volume.

Figure 2:
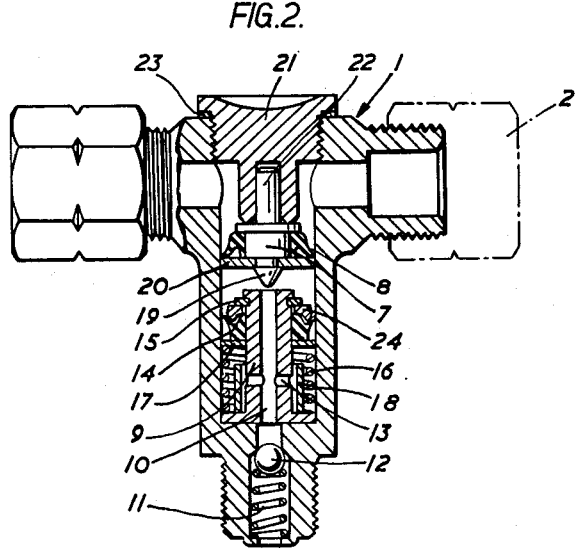

In the injector according to FIG. 2 a plug 21 is screwed into the inlet end of the valve body and the inner end of the plug has a cylindrical socket which forms a positive guide for the spigot 22 of the valve member 7. A sealing ring 23 is placed between the valve body and the head of the plug 21.

Between the piston 14 and the retaining collar 15 is a spreader member 24 which assists in keeping the thin flexible flange of the piston in correct position for making sealing contact with the wall of the injector chamber.

The injector according to FIG. 2 has its outlet passage formed in an integral extension of the injector body instead of in a screwed-on cap portion as in the case of the injector according to FIG. 1. The injector can be disassembled by unscrewing the plug 21 whereupon the valve member 7 and the other parts located within the injector chamber can be removed.

Save in respects above mentioned the injector shown in FIG. 2 is in all respects similar to that shown in FIG. 1.

Injectors as shown can be embodied in lubrication systems for various purposes, e.g., in lubricant distributing systems for vehicles, engines, and industrial plant and machines.

What I claim is:
1. A lubricant injector comprising a part formed internally with a uniform diameter chamber, aligned openings leading transversely into said chamber at one end, means for connecting said aligned openings into a lubrication line, a plug screw-threaded into said part and removable to give axial access to said chamber, valve guide means on said plug, a valve member axially displaceable in said chamber in guide connection with said plug, a lubricant outlet located centrally at the end of said chamber remote from said plug, a spring loaded closure associated with said outlet for retaining lubricant against escape from the chamber save when under pressure, a tube leading axially into said chamber from said outlet, means on said valve member which closes the inner end of said tube when said valve member is against said tube, a piston slidable along said tube and making sealing engagement with the wall of said chamber, spring means urging said piston towards said valve member, stop means limiting the displacement of said piston and at least one port in said tube placing the bore of said tube in communication with the chamber space at the outlet side of said piston.

2. A lubricant injector comprising a body with an internal chamber, a lubricant inlet and a lubricant outlet leading respectively to and from said chamber, closure means which normally closes said outlet but is displaceable into open position under lubricant pressure in said chamber, a tube extending axially into said chamber from said lubricant outlet, a lubricant-discharging piston slidable on said tube, a piston stop on said tube, spring means urging said piston against said stop, further stop means serving to limit movement of said piston against said spring, a port in said tube placing the bore of said tube in communication with the chamber space around said tube at the outlet side of said piston, a non-return valve member axially displaceable in said chamber on the inlet side of said piston over a distance which is less than that over which said piston is movable, said valve member having sealing means co-operating with the wall of the said chamber and permitting passage of lubricant under pressure prevailing at the inlet side of said valve member but not under pressure prevailing at the outlet side thereof, and means associated with said valve member for closing off the bore of said tube at one end thereof when said valve member is in one extreme position.

3. A lubricant injector according to claim 2 wherein said further stop means is formed by a loose second tube surrounding said first tube.

References Cited in the file of this patent
UNITED STATES PATENTS

| | | |
|---|---|---|
| 2,155,250 | Barks | Apr. 18, 1939 |
| 2,612,967 | Leonard | Oct. 7, 1952 |
| 2,742,978 | Peterson et al. | Apr. 24, 1956 |

FOREIGN PATENTS

| | | |
|---|---|---|
| 977,699 | France | Nov. 15, 1950 |